Aug. 29, 1944.  W. L. MORRISON  2,356,778
EVAPORATOR UNIT CONSTRUCTION
Filed Jan. 22, 1940  2 Sheets-Sheet 1
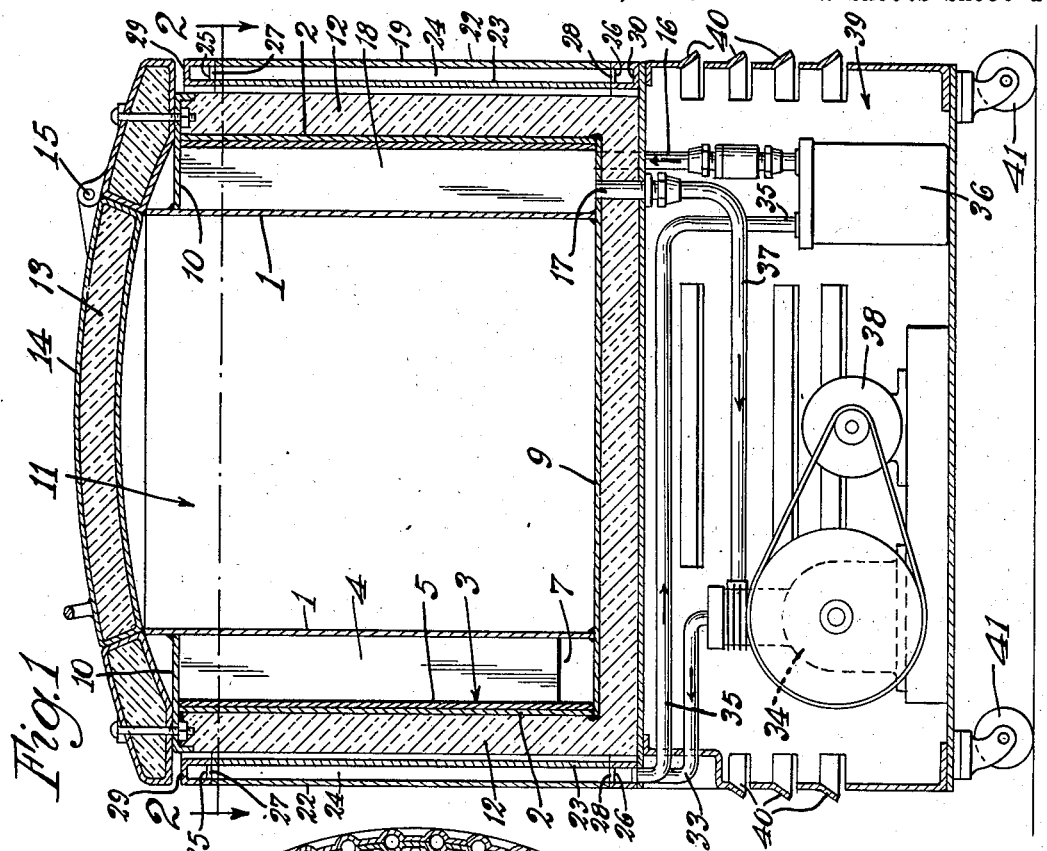
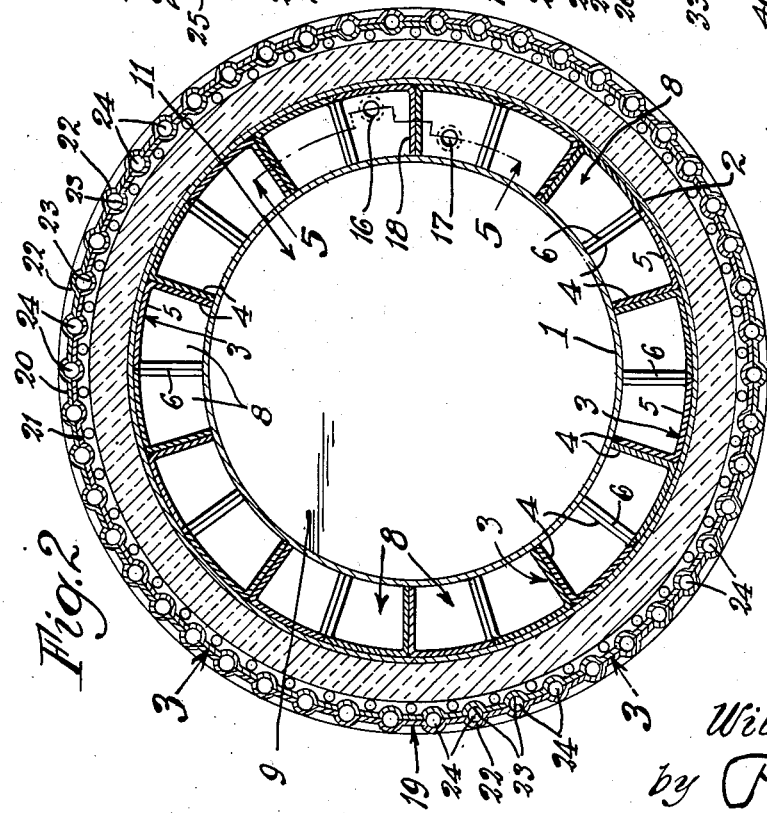
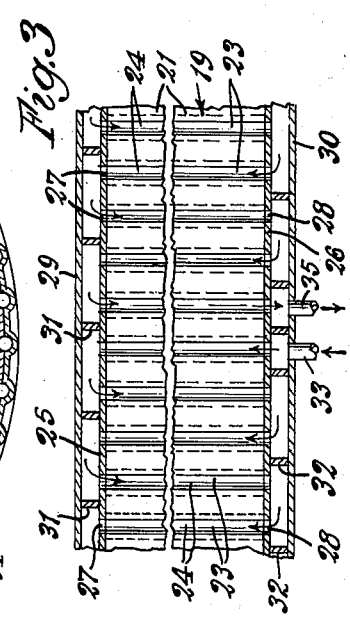
Inventor
Willard L. Morrison
by Parker & Carter
Attorneys Aug. 29, 1944.   W. L. MORRISON   2,356,778
EVAPORATOR UNIT CONSTRUCTION
Filed Jan. 22, 1940   2 Sheets-Sheet 2
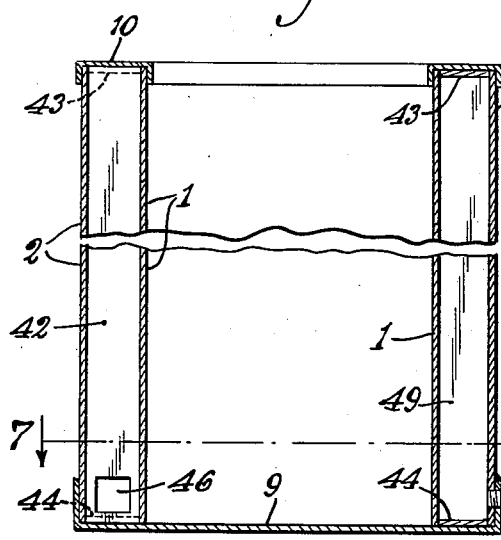
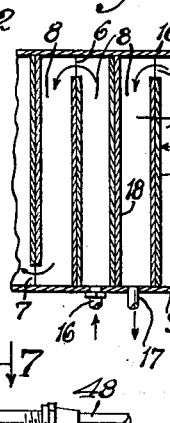
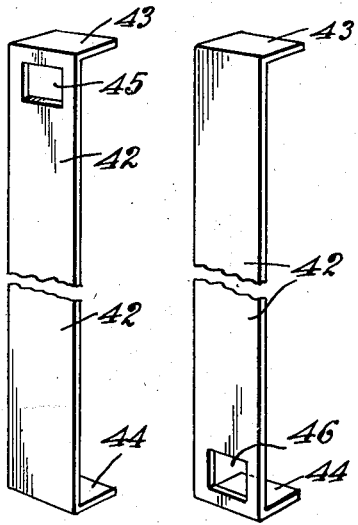
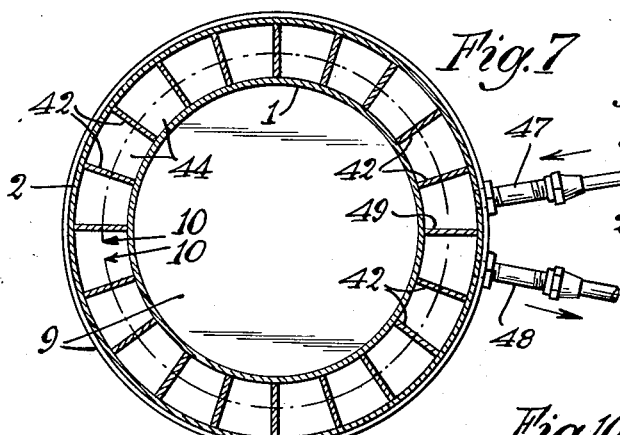
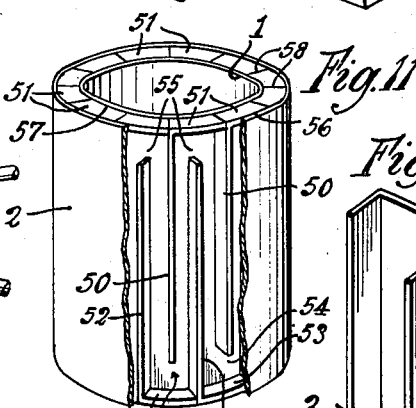
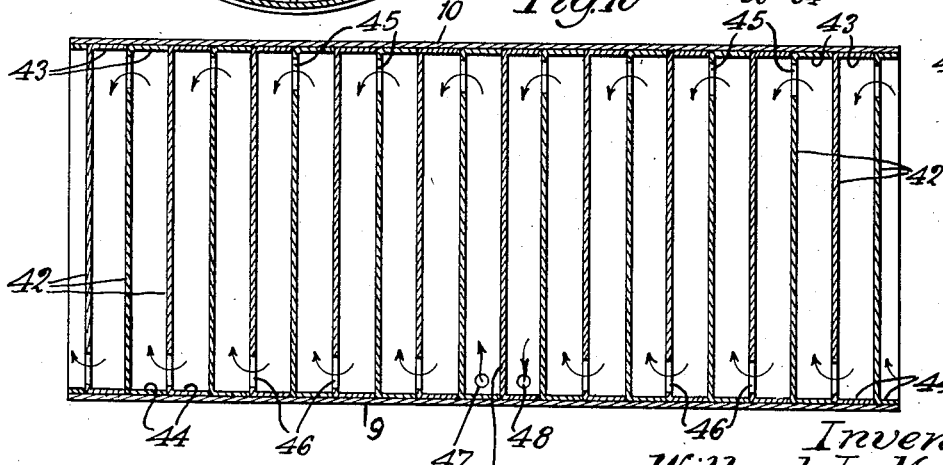
Inventor
Willard L. Morrison
by Parker & Carter
Attorneys Patented Aug. 29, 1944

2,356,778

UNITED STATES PATENT OFFICE 2,356,778

EVAPORATOR UNIT CONSTRUCTION

Willard L. Morrison, Lake Forest, Ill.

Application January 22, 1940, Serial No. 314,922

12 Claims. (Cl. 62—126)

This invention relates to evaporator unit constructions and has for its object to provide a new and improved device of this description.

The invention has as a further object to provide an evaporator unit construction which acts also as the enclosing device for the material to be cooled. The invention has as a further object to provide an evaporator unit construction which is self-supporting. The invention has as a further object to provide an evaporator unit construction which forms a self-contained cooling unit for cooling material.

The invention has as a further object to provide an evaporator unit construction which forms the exterior casing for a refrigerating apparatus. The invention has as a further object to provide an evaporator unit construction which forms a self-contained refrigerating unit. The invention has as a further object to provide an evaporator unit construction which forms the outer casing for a refrigerating unit, with a cooling receptacle on the interior thereof, the outer face or a part thereof, acting to cool a separate room, compartment or chamber.

The invention has as a further object to provide an evaporator unit construction which has an interior cooling chamber and an exterior condenser. The invention has as a further object to provide an evaporator unit construction having heat insulating material on the exterior thereof. The invention has as a further object to provide an evaporator unit construction having heat insulating material on the exterior thereof and a condenser on the outside of the heat insulating material.

The invention has as a further object to provide an evaporator unit construction closed at the bottom and sides and open at the top and having heat insulation on the exterior of the bottom and the sides.

The invention has as a further object to provide an evaporator unit construction formed of two cylinders of different diameters, one within the other, with a space between them and a series of passageways in the space between the two cylinders, connected together to form a conduit for the refrigerant. The invention has as a further object to provide an evaporator unit construction where there are two cylinders of different diameters, one within the other, with a space between them and a series of members in said space extending longitudinally of the cylinders, forming a series of passageways, with means for connecting the passageways together to form a continuous conduit for the refrigerant. The invention has as a further object to provide an evaporator unit construction where there are two cylinders of different diameters, one within the other, with a space between them and a series of members in said space separate from and unconnected with either of said cylinders, dividing the space between the cylinders into a series of passageways, with means for connecting two adjacent passageways together at the top and the next adjacent passageways together at the bottom, to form a continuous conduit for the refrigerant.

The invention has as a further object to provide an evaporator unit construction having two cylinders of different diameters, one within the other, with a space between them and a series of passageways in this space for the refrigerant, arranged so that one or both of the cylinders having primary faces with which the refrigerant makes direct contact. By the term "primary face" or "primary surface" is meant that face or surface, of a thin member of heat conductive material, which is directly exposed to a space to be refrigerated while the other face is directly exposed to a volatile refrigerant.

The invention has further objects which are more particularly pointed out in the accompanying description.

Referring now to the drawings, Fig. 1 is a vertical sectional view through one form of device embodying the invention;

Fig. 2 is a sectional view taken on line 2—2 of Fig. 1;

Fig. 3 is a sectional view taken on line 3—3 of Fig. 2;

Fig. 4 is a perspective view showing one form of the separating members for forming passageways between the cylinders;

Fig. 5 is a sectional view taken on line 5—5 of Fig. 2;

Fig. 6 is a sectional view through the device showing a modified construction;

Fig. 7 is a sectional view taken on line 7—7 of Fig. 6;

Fig. 8 is a perspective view showing one of the partitions;

Fig. 9 is a perspective view showing an adjacent partition;

Fig. 10 is a sectional view taken on line 10—10 of Fig. 7; and

Fig. 11 is a view showing a modification.

Like numerals refer to like parts throughout the several figures.

Referring now to the construction shown in Figs. 1, 2 and 3 there is illustrated an evaporator which is made up of two members, preferably cylindrical, an inner member 1 and an outer member 2, of different diameters, made of heat conducting material, such as any suitable metal, and arranged one within the other so that there will be a space between them.

Located in this space are a series of partitions 3 which divide the space into a series of passageways extending longitudinally of the members. These passageways are connected together to form a continuous passageway for the refrigerant material. The partitions 3 may be of various shapes and forms and are preferably loosely placed in position, although they may be attached to one or both of the members if desired. In the construction shown in Figs. 1, 2 and 4 the partitions 3 are illustrated as channel shaped in cross section and are loosely inserted in the space between the two members. In these figures these channels have the sides 4 and the connecting member 5. The connecting member 5 is shown as in proximity to the outer member 2. The sides of the adjacent partitions extend across the space between the members 1 and 2. One side of each partition is cut away or provided with an opening 6 at the top and the other side is provided with an opening 7 at the bottom, so that when the partitions are placed together, the openings 6 of the adjacent sides register and the openings 7 of the next adjacent sides register. These partitions therefore form a series of passageways 8 connected together by the openings 6 and 7 so as to form a continuous conduit for the refrigerant.

The members 1 and 2 are preferably open at the top and closed at the bottom. The bottoms of the members 1 and 2 may be made integral if desired, but I prefer to have the bottoms separate from the members. When the bottoms are separate from the members, I prefer to have a single bottom 9 which extends across the open ends of both members 1 and 2 and which is fastened to the members to form a tight joint by welding, brazing or any other suitable means. There is a closing member 10 at the top closing the space between the members 1 and 2. This top member is made so that none of the refrigerant can escape.

It will be seen that the members 1 and 2 and the partitions and the top and bottom form a self-contained evaporator. This evaporator can be used in any way desired. It can be used, for example, as a refrigerator, the material to be cooled being placed in the space 11 on the inside of the member 1, and the outside member may be used, for example, to cool a room, compartment or receptacle in which the evaporator may be located. With this construction, the box or casing which is used with the ordinary refrigerator is entirely done away with and the expense thereof eliminated, for the evaporator itself, in addition to being an evaporator, is also the box or casing of the refrigerator.

It will be noted that the device is closed at the bottom and sides and open at the top. I prefer to provide suitable insulating material 12 for the bottom and sides of the device and a top of insulating material. In the construction shown in Figs. 1 and 2, the top is made of the insulating outside member which is supported upon the cylinders and which has a central opening for a cover 14 provided with insulating material 13, preferably attached at 15 to the outside member.

Means is provided for admitting a refrigerant in one end of the conduit formed by the various partitions 3. As herein shown, there is an inlet 16 for the refrigerant and an outlet 17. The wall 18 between the inlet and the outlet has no opening in it.

In the construction shown in Figs. 1 and 2 the condenser 19 is placed on the outside of the insulation 12. This condenser may be made in any desired manner, but is preferably constructed of two sheets 20 and 21 of heat conducting material, such as metal, the sheets being formed with the bent portions 22 and 23 connected together by flattened portions, so that when they are placed together, there is formed a series of passageways 24. The alternate passageways are connected together so as to form a continuous conduit for the refrigerant. This is accomplished by providing a plate 25 at the top and a plate 26 at the bottom. The top plate is provided with openings 27 and the bottom plate is provided with openings 28. There are two outer members 29 and 30 and there are partitions 31 between the outer member 29 and the plate 25 and partitions 32 between the outer member 30 and the plate 26, arranged so that the refrigerant passes down one passageway 24 and up the adjacent passageway and up and down all the way through the conduit of the condenser. There is a connection 33 leading from the compressor 34 to the condenser and a connection 35 leading from the condenser to the inlet 16 of the evaporator. This connection 35 passes through the receiver 36. The outlet 17 of the evaporator is connected by the pipe 37 with the compressor 34. The compressor is operated by the motor 38.

The compressor may be located at any point desired so that the device receives its refrigerant from any suitable source. The condenser may also be located at any point, for example, where the compressor is located, instead of being on the outside of the evaporator. In the construction shown in Figs. 1 and 2 I have located the compressor and associated parts in proximity to the evaporator and in a compartment 39 provided with louvers 40. The entire device may be mounted upon the wheels 41 if desired.

Figs. 6 to 10 show a modified construction of the evaporator. In this construction there are the inner and outer members 1 and 2. In this construction the walls in the space between the members 1 and 2 are constructed so that both the inner member 1 and the outer member 2 are primary surfaces with which the refrigerant is in direct contact. In this construction the walls 42 are provided with end pieces 43 and 44. These walls having openings in them, one wall having an opening 45 near the top and the adjacent wall having an opening 46 near the bottom, so that when the walls are placed in the space between the members 1 and 2, the end pieces 43 and 44 of one wall will be in proximity to the other wall so as to keep the walls properly spaced apart, and the openings 45 and 46 in the adjacent walls connect the passageways formed by the walls into a continuous conduit for the refrigerant. These walls may therefore be loosely inserted in the space between the members 1 and 2.

There is an inlet 47 and an outlet 48 for the refrigerant and the wall 49 between the inlet and the outlet is imperforate, that is, it has no opening in it, so that the refrigerant passing in the inlet 47 passes along the various passageways forming the conduit, until it enters the last passageway with which the outlet is connected and it then passes to the compressor. The refrigerant may be supplied from any suitable source, located at any desired point. In this construction the inner and outer members form primary surfaces, the refrigerant coming into direct contact with both of them.

In Fig. 11 I have shown a further modified construction which simplifies the device and eliminates one of the parts. In this construction the partitions which divide the space between the members 1 and 2 into passageways have laterally extending parts only at one end. For example, the partitions 50 have the laterally extending parts 51 at the upper edge and the partitions 52 have the laterally extending parts 53 at the lower end. The partitions 50 do not extend clear to the bottom, but there is a space 54 between their ends and the bottom. The partitions 52 do not extend clear to the top, but there is a space 55 between their ends and the top. These spaces connect the several passageways between the partitions so as to form a continuous conduit for the refrigerant material.

The laterally projecting parts 51 on the partitions 50 extend across the adjacent partition 52 and to the edge of the adjacent laterally projecting member 51 on the adjacent member 50, and the laterally projecting parts 53 on the partitions 52 have the same form and arrangement. In this construction the members may be assembled in any desired manner and the laterally projecting parts 51 and the member 2 are welded together along the line 56, and the laterally projecting parts 51 are also welded to the member 1 along the line 57. The adjacent laterally projecting parts 51 are welded together along the line 58. This therefore makes a complete closure of the space between the two members 1 and 2 without the necessity of any other closing piece. If desired, some part of the partitions 50 may be welded to one of the members 1 and 2 and some part of the partitions 52 to the other member, and then the member 1 inserted in the member 2. After the parts are thus brought together, the edges of the laterally projecting parts 51 and the members 1 and 2 are welded together to form a gas tight construction as heretofore set out. The laterally projecting parts 53 may also be welded together and to the members 1 and 2 so as to make a gas tight seal at the bottom between the members.

It will further be noted that I have here an evaporator unit construction having an evaporator with a frame, the frame of the evaporator also forming the refrigerator box or receptacle in which the material to be cooled is received. It will further be seen that in this construction there are two members, one within the other, with a space between them and a series of passageways formed in this space, one wall of each passageway being formed by one of said members.

It will further be noted that the outer casing of the refrigerator box or receptacle also constitutes the outer case of the evaporator. In other words, the evaporator and the refrigerator box are one and the same devices, the evaporator having in addition to its use as an evaporator, another use as the outer wall of the refrigerator box.

I have illustrated in the drawings certain constructions embodying the invention, but it is of course evident that the parts may be varied in many particulars without departing from the spirit of the invention as embodied in the claims hereto appended, and I therefore do not limit myself to the particular construction shown.

I claim:

1. An evaporator unit construction comprising two cylinders of different diameters, one within the other, the inner cylinder formed of heat conducting material, said cylinders having a space between them, a series of separate pieces disposed in said space dividing said space into a series of passageways connected together to form a continuous conduit for refrigerant material, one of said cylinders forming a portion of each of said passageways, and means for connecting said passageways with a source of refrigerant material, the inner cylinder forming a cooling receptacle for the material to be cooled, said pieces disposed in the space between the cylinders being loosely disposed in position so that refrigerant gas may pass between them and the inner cylinder so that the inner surface of the inner cylinder is a continuous primary surface.

2. An evaporator unit construction comprising two cylinders of different diameters, one within the other, the inner cylinder formed of heat conducting material, said cylinders having a space between them, a series of separate pieces disposed in said space and substantially parallel to the axis of said cylinders, dividing said space into a series of passageways connected together to form a continuous conduit for refrigerant material, one of said cylinders forming a portion of each of said passageways, and means for connecting said passageways with a source of refrigerant material, said pieces disposed in the space between the cylinders being loosely disposed in position so that refrigerant gas may pass between them and the inner cylinder so that the inner surface of the inner cylinder is a continuous primary surface, the inner cylinder forming a cooling receptacle for the material to be cooled.

3. A refrigerator unit construction comprising an evaporator made up of two cylinders of different diameters, one within the other, the inner cylinder formed of heat conducting material, said cylinders having a space between them divided into a series of connected passageways for refrigerant material, one of said cylinders forming a portion of each of said passageways, and means for connecting said passageways with a source of refrigerant material, the inner cylinder forming a cooling receptacle for the material to be cooled, heat insulating material on the outside of said outer cylinder, and a condenser surrounding the outer cylinder and the heat insulating material associated therewith.

4. A refrigerator structure comprising a compressor, a condenser, an evaporator, and supporting means housing the compressor and holding the condenser and the evaporator in fixed relation to each other, said condenser comprising a sheet metal, double walled structure of substantially cylindrical shape and forming the outer casing of a compartment, said evaporator comprising two cylinders of different diameter, one within the other, a circular sheet of metal, the inner cylinder being mounted on said circular sheet and cooperating therewith to form the wall structure of a cooling receptacle, said cylinders having a space between them, a series of separate pieces mounted in said space and dividing the same into a series of passageways connected together to form a continuous conduit for refrigerant material, said evaporator being mounted concentrically with respect to, and in the compartment partially defined by, said condenser, there being a space between the outer cylinder of the evaporator and the condenser, said space being filled with insulating material, and an insulated cover structure forming a top for said compartment and including a door of substantially the same diameter as, and arranged substantially concentrically with, the inner cylinder.

5. A refrigerator comprising a cabinet of substantially cylindrical shape and a refrigerating system carried thereby, said cabinet being divided into an upper compartment and a lower compartment by a wall made up of a pair of spaced metal sheets with insulation therebetween, said refrigerating system comprising a compressor and a motor for driving the compressor mounted in the lower compartment, a condenser forming an outer casing around the upper compartment, an evaporator in the upper compartment and comprising two cylinders of different diameters, one within the other, said cylinders having a space between them, a series of separate pieces mounted in said space and dividing said space into a series of passages connected together to form a continuous conduit for refrigerant material, the inner cylinder cooperating with the upper metal sheet of said wall to define a cooling receptacle for material to be cooled, means connecting said evaporator to said compressor and said condenser and an insulated cover structure forming a top for said upper compartment, and including a door of substantially the same diameter as, and arranged concentrically with, the inner cylinder.

6. In a refrigeration apparatus, refrigerant liquifying means and an evaporator in series therewith, said evaporator comprising two elements with curved surfaces one surrounding the other and being outwardly spaced therefrom, said elements having a tortuous passage in the space therebetween made up of a series of generally parallel runs each separated from an adjacent run by a common wall structure, the structures having openings therein forming parts of said tortuous passage, said structures being so constructed and arranged with the inner element as to provide a leakage between runs of sufficient refrigerant to maintain the portions of the inner element opposed to said structures at the same temperature as the rest of said inner element.

7. The structure of claim 6 characterized by and including a bottom closure for the space within the inner member adapted with said inner member to define a storage space open at the top.

8. The combination with a self-supporting evaporator and storage unit comprising an inner cylinder, an intermediate cylinder and an outer cylinder, said inner and intermediate cylinders being sealed together at their ends, a bottom element closing the bottom of said inner cylinder, a plurality of baffles located in the space between said inner and intermediate cylinders and dividing the same into a tortuous passage, there being a clearance about said baffles sufficient to permit leakage between runs of said passage, of a layer of insulating material between the intermediate and outer cylinders, a closure cover for the open top of the space defined by the inner cylinder, circumferentially extending heat insulating means extending above the spaces defined between said inner and outer cylinders, means for circulating a refrigerant through the tortuous passage, a base housing upon which said self-supporting unit is positioned, and a compressor in said housing.

9. The combination with a self-supporting evaporator and storage unit comprising an inner cylinder, an intermediate cylinder and a outer cylinder, said inner and intermediate cylinders being sealed together at their ends, a bottom element closing the bottom of said inner cylinder, a plurality of baffles located in the space between said inner and intermediate cylinders and dividing the same into a tortuous passage, there being a clearance about said baffles sufficient to permit leakage between runs of said passage, of a layer of insulating material between the intermediate and outer cylinders, a closure cover for the open top of the space defined by the inner cylinder, circumferentially extending heat insulating means extending above the spaces defined between said inner and outer cylinders, means for circulating a refrigerant through the tortuous passage, and a base upon which said self-supporting unit is positioned.

10. In combination, in a refrigeration apparatus, a cabinet, a machinery housing connected to said cabinet, refrigerant liquifying means in said housing, an evaporator structure in said cabinet, comprising an inner cylinder closed at the bottom and open at the top and circumferentially defining a storage space, and an intermediate cylinder surrounding said inner cylinder and sealed thereto at top and bottom, and forming therewith an evaporator chamber connected to said refrigerant liquifying means, insulating material surrounding said evaporator structure and extending beneath it, and forming a support therefor, an outer cylinder surrounding said insulating material and forming the exterior vertical wall of the cabinet, said evaporator forming the skeleton of said cabinet about which the rest of the cabinet is built, a closure member for the upper end of said cabinet, including a removable closure element vertically aligned with and located above the space circumferentially defined by said inner cylinder, said machinery housing being located below and in vertical alignment with said cabinet.

11. The structure of claim 10 characterized by and including a circumferential and generally cylindrical wall defining said machinery housing, said wall being vertically generally aligned with and generally concentric with said outer cylinder.

12. In combination, in a refrigeration apparatus, a cabinet, a machinery housing connected to said cabinet, refrigerant liquifying means in said housing, an evaporator structure in said cabinet, comprising an inner cylinder closed at the bottom and open at the top and circumferentially defining a storage space, and an intermediate cylinder surrounding said inner cylinder and sealed thereto at top and bottom, and forming therewith an evaporator chamber connected to said refrigerant liquifying means, insulating material surrounding said evaporator structure and extending beneath it, and forming a support therefor, an outer cylinder surrounding said insulating material and forming the exterior vertical wall of the cabinet, said evaporator forming the skeleton of said cabinet about which the rest of the cabinet is built, said outer cylinder including a condenser coil in communication with said refrigerant liquifying means.

WILLARD L. MORRISON.